US012266234B1

(12) United States Patent
Gillette

(10) Patent No.: US 12,266,234 B1
(45) Date of Patent: Apr. 1, 2025

(54) BRIDGE ADAPTED TO SUPPLY DIRECT CURRENT FOR TEMPORARILY SUSTAINING A GAMING MACHINE'S MEMORY

(71) Applicant: Veril Gillette, Henderson, NV (US)

(72) Inventor: Veril Gillette, Henderson, NV (US)

( * ) Notice: Subject to any disclaimer, the term of this patent is extended or adjusted under 35 U.S.C. 154(b) by 250 days.

(21) Appl. No.: 18/125,763

(22) Filed: Mar. 24, 2023

Related U.S. Application Data

(60) Provisional application No. 63/329,667, filed on Apr. 11, 2022.

(51) Int. Cl.
*A63F 9/24* (2006.01)
*G07F 17/32* (2006.01)

(52) U.S. Cl.
CPC ................................ *G07F 17/3202* (2013.01)

(58) Field of Classification Search
None
See application file for complete search history.

(56) References Cited

U.S. PATENT DOCUMENTS

| | | | |
|---|---|---|---|
| 5,344,144 A | 9/1994 | Canon |
| 5,851,149 A | 12/1998 | Xidos et al. |
| 6,286,088 B1 | 9/2001 | Campbell et al. |
| 9,171,420 B2 | 10/2015 | Arbogast et al. |
| 9,495,831 B1 | 11/2016 | Friedman et al. |
| 9,836,918 B2 | 12/2017 | Nelson |

FOREIGN PATENT DOCUMENTS

| | | |
|---|---|---|
| JP | 6029125 | 11/2016 |
| WO | WO2000005652 | 2/2000 |
| WO | WO2007103170 A2 | 9/2007 |
| WO | WO2004025655 A2 | 3/2014 |

*Primary Examiner* — Sunit Pandya

(74) *Attorney, Agent, or Firm* — BUSINESS PATENT LAW, PLLC

(57) ABSTRACT

A bridge temporarily providing direct current to a gaming machine's memory allowing a replacement battery to be introduced into the gaming machine.

20 Claims, 3 Drawing Sheets

BRIDGE ADAPTED TO SUPPLY DIRECT CURRENT FOR TEMPORARILY SUSTAINING A GAMING MACHINE'S MEMORY

PRIORITY

Applicant claims the benefit of U.S. Provisional Application No. 63/329,667—Slot Machine Setting Saver—filed Apr. 11, 2022.

BACKGROUND OF THE INVENTION

1. Field of the Invention

Among other things, the present invention is a bridge that can temporarily provide direct current to a gaming machine's memory. Supplying direct current to the gaming machine's memory prevents loss of the gaming machine's settings. It appears that use of the current bridge allows the technician to change the gaming machine's battery quicker than previous methods of the changing the battery of a gaming machine.

2. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

22 References that may indicate a state-of-the-art include: 1) WO2004025655A2-Nelson discloses a Dynamic NV-Ram; 2) JP6029125B1-Sammy Corp; 3) U.S. Pat. No. 9,836,918B2-Nelson discloses remote configuration of gaming terminals; 4) U.S. Pat. No. 9,495,831B1-Friedman et al discloses method, apparatus, and computer readable storage to determine and/or update slot machine configurations using historical and/or current and/or predicted future data; 5) WO2007103170A2-Wolf et al discloses non-volatile memory management technique implemented in a gaming machine; 6) U.S. Pat. No. 9,171,420B2-Arbogast et al disclose assignment template and assignment bundle in a gaming configuration and download system; 7) U.S. Pat. No. 5,851,149-Xidos et al disclosed a distributed gaming system; 8) U.S. Pat. No. 5,344,144-Canon disclose a progressive jackpot gaming system with enhanced accumulator; 9) WO2000005652A1-Fresco et al discloses method and apparatus for achieving deterministic memory allocation response in a computer system; and 10) U.S. Pat. No. 6,286,088-Campbell et al. discloses memory management system and method for relocating memory.

SUMMARY OF THE INVENTION

Among other things, the current invention allows the technician to more quickly changing a gaming machine's batter more quickly than previous methods.

An aspect of the bridge is to provide a temporary source of direct current for preventing the gaming machine's settings portion of the gaming machine's memory from being lost during replacement of the gaming machine's old battery.

Still another aspect of the bridge is to provide a handheld device easily connectable to the gaming machine.

It is another aspect of the bridge to provide the capability of detecting the voltage of the gaming machine's battery.

Yet another aspect of bridge is to warn the user when the voltage of the gaming machine's battery is less than a predetermined value.

Still another aspect of the bridge is to provide the capability of detecting a predetermined level of the voltage of the store of direct current.

It is still another aspect of the bridge to provide notification to the user of the bridge when the store of direct current is below a predetermined voltage.

Yet another aspect of the bridge is to utilize LEDs to inform the user of preselected parameters regarding use and status of the bridge.

A preferred embodiment of the present invention can be described as a bridge adapted to supply direct current for sustaining a gaming machine's memory during a replacement of the gaming machine's battery supplying power to the gaming machine's memory storing a set of existing gaming settings for the gaming machine; the bridge comprising: a) a circuit connected to a store of direct current and adapted to transport voltage from the store of direct current to the gaming machine's memory; the circuit further comprising: i) a first pair of parallel LEDs determining the connectivity of the bridge to the gaming machine's memory, wherein a first configuration of lighting of the first pair of parallel LEDs indicates that the bridge is properly connected to the gaming machine; ii) a plurality of resistors, first and second transistors/drivers and a second pair of LEDs; the plurality configured to identify when the store of direct current has less than 2.5 volts; b) the store of direct current adapted to provide from about 2.5 volts to about 3.7 volts of temporary power to the gaming machine's memory, thereby preventing memory loss of the set of existing gaming settings of the gaming machine; c) a manual switch allowing the direct current to flow from the store of direct current through the circuit to the gaming machine's memory; d) a first connector connected to an output lead and the gaming machine's battery holder; e) a second connector connected to a ground lead; and f) a charging module comprising a charging port adapted to charge direct current to the store of direct current.

Another preferred embodiment of the present invention can be described as a bridge adapted to supply direct current for sustaining a gaming machine's memory during a replacement of the gaming machine's battery supplying power to the gaming machine's memory storing a set of existing gaming settings for the gaming machine; the bridge comprising: a) a circuit connected to a store of direct current and adapted to transport voltage from the store of direct current to the gaming machine's memory; the circuit comprising a first pair of parallel LEDs determining the connectivity of the bridge to the gaming machine's memory, wherein a first configuration of lighting of the first pair of parallel LEDs indicates that the bridge is properly connected to the gaming machine; b) the store of direct current adapted to provide from about 2.5 volts to about 3.7 volts of temporary power to the gaming machine's memory, thereby preventing memory loss of the set of existing gaming settings of the gaming machine; c) a switch allowing the direct current to flow from the store of direct current through the circuit to the gaming machine's memory; d) a first connector connected to an output lead and the gaming machine's battery holder; and e) a second connector connected to a ground lead.

Yet another preferred embodiment of the present invention can be described as a bridge adapted to supply direct current for sustaining a gaming machine's memory during a replacement of the gaming machine's battery supplying power to the gaming machine's memory storing a set of existing gaming settings for the gaming machine; the bridge (30) comprising: a) a circuit connected to a store of direct current and adapted to transport voltage from a store of direct current to the gaming machine's memory; b) the store of direct current adapted to provide from about 2.5 volts to about 3.7 volts of temporary power to the gaming machine's memory, thereby preventing memory loss of the set of existing gaming settings of the gaming machine; c) a first connector connected to an output lead and the gaming machine's battery holder; and d) a second connector connected to a ground.

It is the novel and unique interaction of these simple elements which creates the apparatus, within the ambit of the present invention. Pursuant to Title 35 of the United States Code, descriptions of preferred embodiments follow. However, it is to be understood that the best mode or preferred descriptions do not limit the scope of the present invention.

DESCRIPTION OF THE PREFERRED EMBODIMENTS

The disclosure hereof is detailed to enable those skilled in the art to practice the invention, and the embodiments published herein merely exemplify the present system, methods and devices and do not limit the scope of the claims appended hereto.

The present invention is directed toward a bridge (30) that can temporarily provide direct current to a gaming machine's (20) memory. A gaming machine (20) such as an electric slot machine includes a settings portion of the memory. The settings portion of the memory allows the owner of the gaming machine (20) to adjust the "payout" amounts according to the legal requirements of the jurisdiction where the gaming machine (20) is located. The settings portion of the memory also allows the owner to adjust the gaming machine's (20) settings at frequencies allowed by law.

When the voltage contained in the gaming machine's battery (22) is lower than a certain level, the settings portion of the memory can become unstable-resulting in loss the gaming machine's (20) settings. Most current gaming machines (20) can warn the owner when the voltage supplied to the gaming machine's (20) settings is in the range of 1.6 to 1.7 volts indicating that the battery for the gaming machine (20) should be replaced. The traditional method of replacing the battery supplying direct current to the gaming machine's (20) settings is to stop play of the gaming machine (20), remove the old battery and replace it with a new battery (22). This procedure causes loss of the gaming machine's (20) settings. Before the gaming machine (20) can be used, a technician must reprogram the gaming machine's (20) settings which can require thirty minutes or more.

Figure 1:
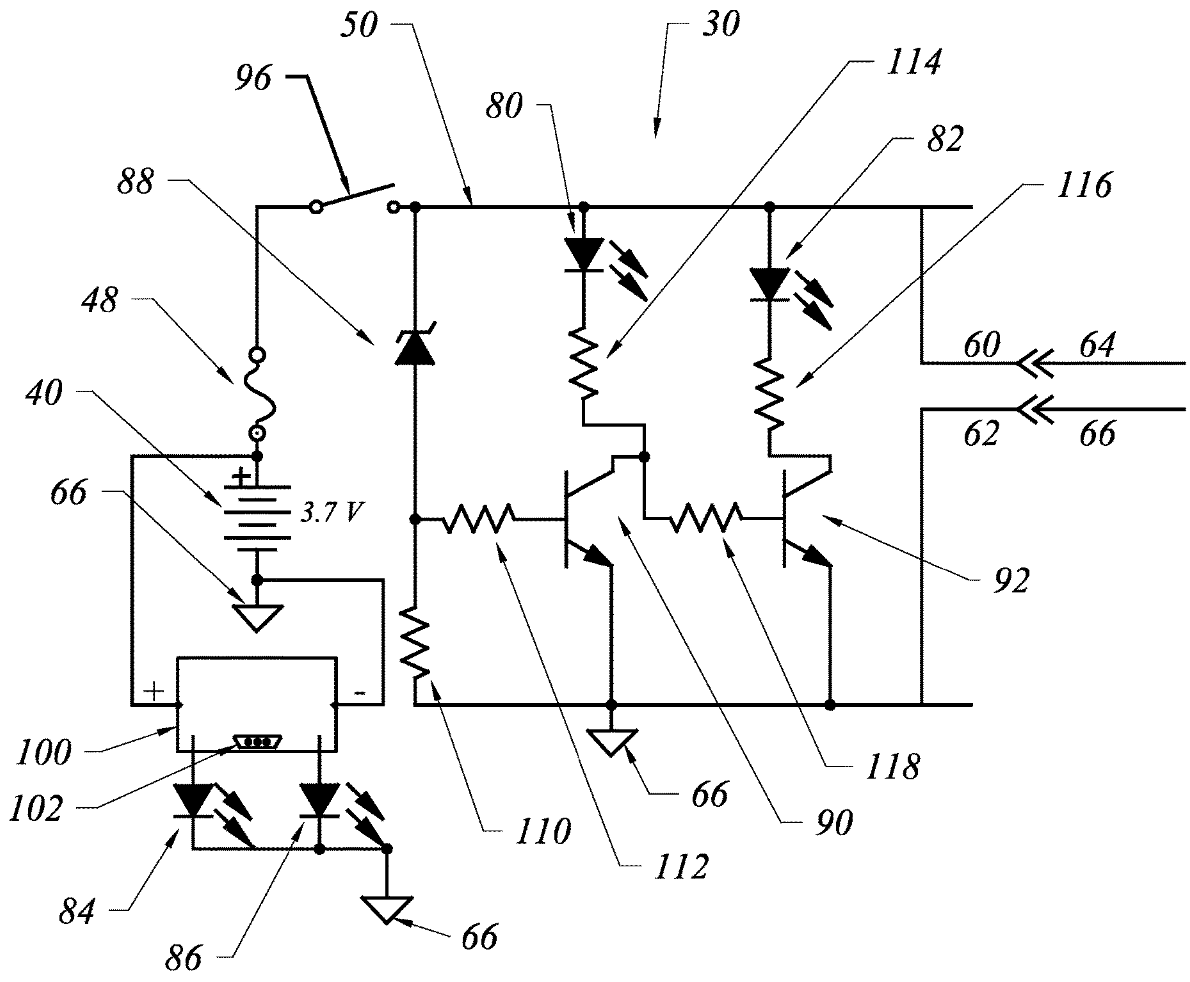
FIG. 1 is a schematic of circuit (50).

The present invention shown in FIG. 1 provides a bridge (30) supplying direct current to the settings portion of the gaming machine's (20) memory so that the gaming machine's (20) settings are not lost during the replacement of the gaming machine's battery (22). Among other things, the gaming machine (20) includes a battery holder (24) holding the battery (22) supplying direct current to the memory and a ground.

Bridge (30) is adapted to supply direct current that temporarily sustains the gaming machine's (20) memory, while the gaming machine's battery (22) supplying power to the gaming machine's (20) memory storing a set of existing gaming settings for the gaming machine (20) is replaced. Among other things, bridge (30) includes module (100), store of direct current (40) circuit (50), switch (96), first connector (60), second connector (62), charging port (102), and optionally, fuse (48).

Module (100) charges direct current to the store of direct current (40). Within the scope of the current invention, the store (40) of direct current can be any store acceptable in the art. Store (40) is adapted to provide from about 2.5 volts to about 3.7 volts of temporary power to the gaming machine's (20) memory. The continuous supply of power to the gaming machine's (20) memory prevents memory loss of the set of existing gaming settings of the gaming machine (20).

Circuit (50) is connected to store of direct current (40) and adapted to transport voltage from store of direct current (40) to the gaming machine's (20) memory.

Circuit (50) includes a first pair of parallel LEDs (80, 82). LEDs (80, 82) determine the connectivity of the bridge (30) to the gaming machine's (20) memory.

Circuit (50) is adjusted such that a first configuration of lighting of the first pair of parallel LEDs (80, 82) indicates that the bridge (30) is properly connected to the gaming machine (20). Those skilled in the art recognize that various lighted colors of LEDs can be utilized to show the first configuration. In an embodiment of bridge (30), LEDs (80, 82) are green and red. Depending on engineering parameters, the lighting of both green and red, green alone or red alone can identify the connectivity of bridge (30) to the gaming machine (20). In select preferred embodiments, green and red LEDs (80, 82) signify bridge is connected to the gaming machine (20), after switch (96) completes circuit (50), only a green LED (80) remains lighted.

Circuit (50) includes a plurality of resistors (110, 112, 114, 116, 118), first and second transistors/drivers (90, 92) and a second pair of LEDs (84, 86) proximate the module (100). Among other things, this plurality is configured to identify when the store of direct current (40) has less than 2.5 volts. In an embodiment of bridge (30), LEDs (84, 86) can be green and red. Depending on engineering parameters, the lighting of a single LED (80 or 82) can identify when store of direct current (40) has less than 2.5 volts. In a preferred embodiment of bridge (30), LED (82) is red and LED (80) is green, and a red LED (82) identifies that store of direct current (40) contains less than 2.5 volts.

LED (84) lights when charging direct current to store of direct current (40). When LED (86) lights, store of direct current (40) is charged. In a preferred embodiment of bridge (30), LED (84) lights red and LED (86) lights blue. Preferred embodiments of bridge (30) can utilize 2N3904 transistors (92, 94).

As shown, manual switch (96) allows direct current to flow from the store of direct current (40) through the circuit (50) to the gaming machine's (20) memory. In other preferred embodiments, an electronic switch (96) can be utilized.

In operation of bridge (30), first connector (60) is connected to circuit (50) and also connected to output lead (64) and the gaming machine's battery holder (24). Second connector (62) is connected to ground (66). Output lead (64)

and ground (66) can be provided with alligator clips or other types of connecting accessories (not shown in the Drawings).

Charging port (102) is connected to module (100). Charging port (102) can be a female USB or any other port acceptable in the art. Charging port (102) is adapted to supply direct current to store of direct current (40).

Zener diode (88) reverses flow of the direct current when the voltage of store of direct current (40) is less than 2.5 volts. The reversal of direct current causes the lighting of LED (82) that can remain lighted until voltage of store of direct current (40) is 2.5 volts or more.

Preferred embodiments of bridge (30) can be provided with a fuse (48). Select preferred embodiments of fuse (48) are positioned between store of direct current (40) and switch (96).

Parallel LEDs (80, 82) are lighted in a second configuration when the gaming machine's battery (22) is in the range of 1.6 to 1.7 volts. The lighting of the second configuration warns the user of the bridge (30) that the voltage of the gaming machine's battery (22) is low.

Figure 2:
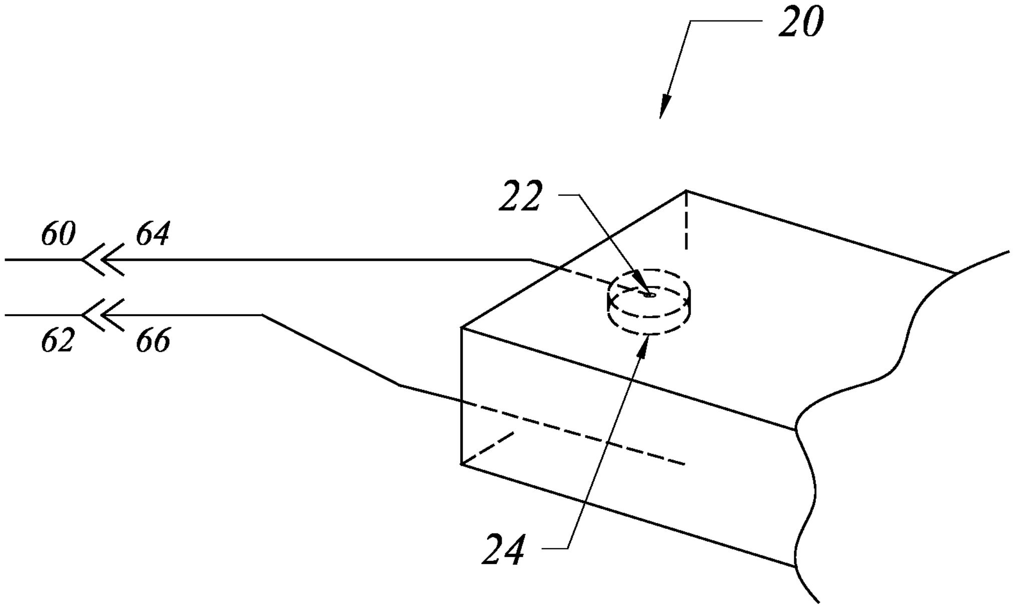
FIG. 2 is a depiction of circuit (50) connected to gaming machine's (20) memory and battery/battery holder (22).

FIG. 2 is a depiction of circuit (50) connected to gaming machine's (20) memory and battery/battery holder (22). First connector (60) is connected to an output lead (64) and the gaming machine's battery holder (24). Second connector (62) is connected to ground (66).

Figure 3:
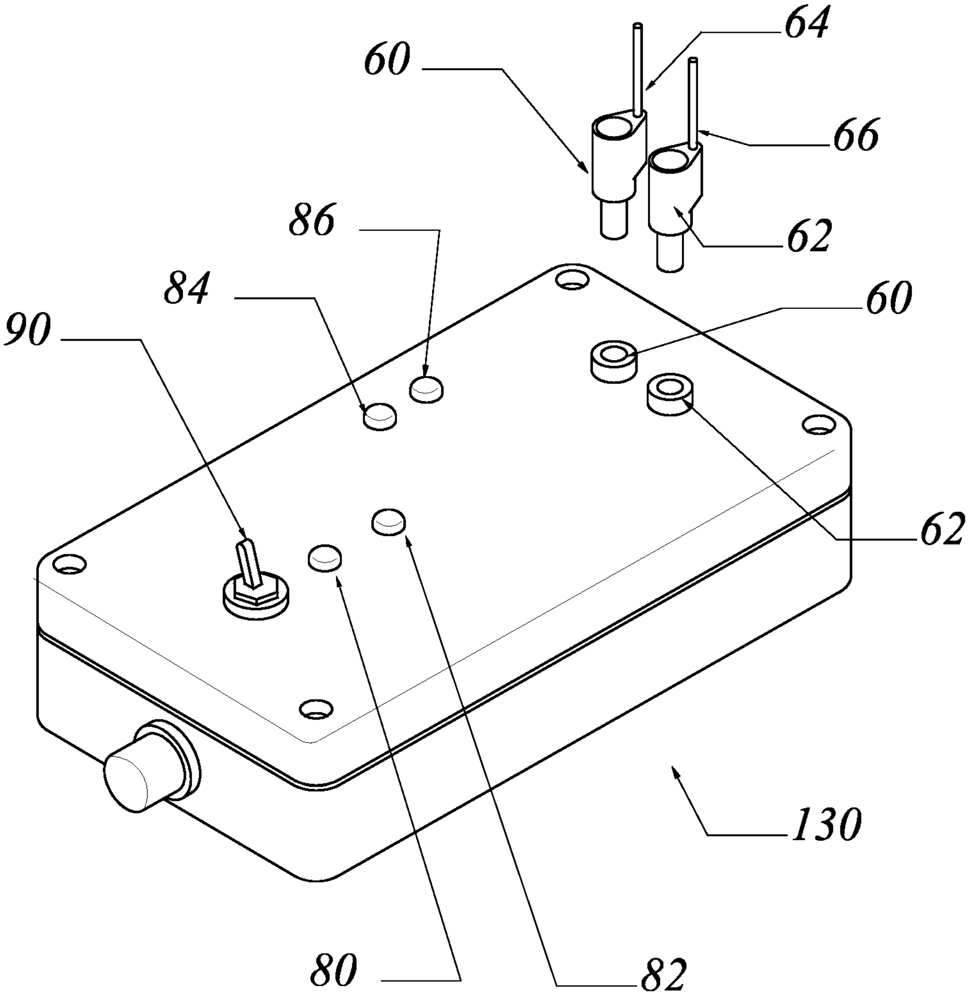
FIG. 3 is a perspective of a hand held device (130) containing bridge (30).

FIG. 3 is a perspective of a hand held device (130) containing bridge (30).

Operation of bridge (30) includes connecting a first connector (60) output lead (64) and the gaming machine's battery holder (24) and connecting second connector (62) to a ground (66) of gaming machine (20). The user of bridge (30) closes switch (96) connecting circuit (50) with store of direct current (40). Direct current flows to the gaming machine's (20) memory to prevent loss of the gaming machine's (20) settings while the gaming machine's battery (22) is changed. When the gaming machine's battery (22) is replaced, output lead (64) and ground (66) are disconnected from the gaming machine (20).

Having disclosed the invention as required by Title 35 of the United States Code, Applicant now prays respectfully that Letters Patent be granted for his invention in accordance with the scope of the claims appended hereto.

What is claimed is:

1. A bridge adapted to supply direct current for sustaining a gaming machine's memory during a replacement of the gaming machine's battery supplying power to the gaming machine's memory storing a set of existing gaming settings for the gaming machine; the bridge comprising:

a) a circuit connected to a store of direct current and adapted to transport voltage from the store of direct current to the gaming machine's memory; the circuit further comprising:
   i) a first pair of parallel LEDs determining the connectivity of the bridge to the gaming machine's memory, wherein a first configuration of lighting of the first pair of parallel LEDs indicates that the bridge is properly connected to the gaming machine;
   ii) a plurality of resistors, first and second transistors/drivers and a second pair of LEDs; the plurality configured to identify when the store of direct current has less than 2.5 volts;
b) the store of direct current adapted to provide from about 2.5 volts to about 3.7 volts of temporary power to the gaming machine's memory, thereby preventing memory loss of the set of existing gaming settings of the gaming machine;
c) a manual switch allowing the direct current to flow from the store of direct current through the circuit to the gaming machine's memory;
d) a first connector connected to an output lead and the gaming machine's battery holder;
e) a second connector connected to a ground lead; and
f) a charging module comprising a charging port adapted to charge direct current to the store of direct current.

2. The bridge of claim 1, wherein when the voltage of the store of direct current is less than 2.5 volts, the Zener diode reverses flow of the direct current causing lighting of LED (82).

3. The bridge of claim 2 comprising a fuse positioned between the store of direct current and the manual switch.

4. The bridge of claim 3, wherein when the bridge measures voltage in the range of 1.6 to 1.7 volts contained by the gaming machine, the first pair of parallel LEDs is lighted in a second configuration warning of the gaming machine's low voltage.

5. The bridge of claim 4, wherein the transistors/drivers are 2N3904 transistors.

6. A bridge adapted to supply direct current for sustaining a gaming machine's memory during a replacement of the gaming machine's battery supplying power to the gaming machine's memory storing a set of existing gaming settings for the gaming machine; the bridge comprising:

a) a circuit connected to a store of direct current and adapted to transport voltage from the store of direct current to the gaming machine's memory; the circuit comprising a first pair of parallel LEDs determining the connectivity of the bridge to the gaming machine's memory, wherein a first configuration of lighting of the first pair of parallel LEDs indicates that the bridge is properly connected to the gaming machine;
b) the store of direct current adapted to provide from about 2.5 volts to about 3.7 volts of temporary power to the gaming machine's memory, thereby preventing memory loss of the set of existing gaming settings of the gaming machine;
c) a switch allowing the direct current to flow from the store of direct current through the circuit to the gaming machine's memory;
d) a first connector connected to an output lead and the gaming machine's battery holder; and
e) a second connector connected to a ground lead.

7. The bridge of claim 6 comprising a plurality of resistors, first and second transistors/drivers and a second pair of LEDs remote from the first pair of LEDs.

8. The bridge of claim 7, wherein resistor: (110) is 68 ohms; (112) is 330 ohms; (114) is 56 ohms; (116) is 1 kiloohm; and (118) is 300 ohms.

9. The bridge of claim 7, wherein when the voltage of the store of direct current is less than 2.5 volts, the Zener diode reverses flow of the direct current causing lighting of LED (82).

10. The bridge of claim 9 comprising a fuse positioned between the store of direct current and the switch.

11. The bridge of claim 10, wherein when the bridge measures voltage in the range of 1.6 to 1.7 volts contained by the gaming machine, the first pair of parallel LEDs (80, 82) is lighted in a second configuration warning of the gaming machine's low voltage.

12. The bridge (30) of claim 11, wherein the transistors/drivers are 2N3904 transistors.

13. The bridge of claim 12 comprising a charging module comprising a charging port adapted to charge direct current to the store of direct current.

14. A bridge adapted to supply direct current for sustaining a gaming machine's memory during a replacement of the gaming machine's battery supplying power to the gaming machine's memory storing a set of existing gaming settings for the gaming machine; the bridge comprising:

a) a circuit connected to a store of direct current and adapted to transport voltage from a store of direct current to the gaming machine's memory;

b) the store of direct current adapted to provide from about 2.5 volts to about 3.7 volts of temporary power to the gaming machine's memory, thereby preventing memory loss of the set of existing gaming settings of the gaming machine;

c) a switch allowing the direct current to flow from the store through the circuit to the gaming machine's memory;

d) a first connector connected to an output lead and the gaming machine's battery holder; and e) a second connector connected to a ground.

15. The bridge of claim 14 comprising a plurality of resistors, first and second transistors/drivers, a first pair of LEDs and a second pair of LEDs remote from the first pair of LEDs.

16. The bridge of claim 15, wherein a first configuration of lighting of the first pair of parallel LEDs indicates that the bridge is properly connected to the gaming machine.

17. The bridge of claim 16, wherein resistor: (110) is 68 ohms; (112) is 330 ohms; (114) is 56 ohms; (116) is 1 kiloohm; (118) is 300 ohms and transistors/drivers (90, 92) are 2N3904 transistors.

18. The bridge of claim 17, wherein when the voltage of the store of direct current is less than 2.5 volts, the Zener diode reverses flow of the direct current causing 19 lighting of LED (114).

19. The bridge of claim 18 comprising a fuse positioned between the store of direct current and the switch.

20. The bridge of claim 19 comprising a charging module comprising a charging port adapted to charge direct current to the store of direct current (40).

* * * * *